(12) United States Patent
Hazama

(10) Patent No.: US 8,715,844 B2
(45) Date of Patent: May 6, 2014

(54) ELECTRONIC APPARATUS

(75) Inventor: Hisakazu Hazama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 669 days.

(21) Appl. No.: 12/703,111

(22) Filed: Feb. 9, 2010

(65) Prior Publication Data

US 2010/0203375 A1    Aug. 12, 2010

(30) Foreign Application Priority Data

Feb. 12, 2009 (JP) ................................. 2009-029906

(51) Int. Cl.
*H01M 2/10* (2006.01)

(52) U.S. Cl.
USPC ................. 429/97; 429/96; 429/98; 429/100; 429/123

(58) Field of Classification Search
USPC ........................................... 429/96–100, 123
See application file for complete search history.

(56) References Cited

U.S. PATENT DOCUMENTS

| 6,345,157 | B1 * | 2/2002 | Watanabe | 396/279 |
| 2004/0058231 | A1 * | 3/2004 | Takeshita et al. | 429/123 |
| 2005/0130029 | A1 * | 6/2005 | Kim | 429/97 |
| 2007/0054181 | A1 * | 3/2007 | Nagano | 429/97 |
| 2007/0196726 | A1 * | 8/2007 | Nakashima et al. | 429/99 |
| 2008/0083252 | A1 * | 4/2008 | Cho | 70/207 |
| 2008/0268329 | A1 * | 10/2008 | Mackle et al. | 429/97 |

FOREIGN PATENT DOCUMENTS

| JP | 4019776 B2 | 11/2003 |
| JP | 2004-199996 | * 7/2004 |
| JP | 2004-199996 A | 7/2004 |
| JP | 2006-039075 A | 2/2006 |
| JP | 2006-350055 A | 12/2006 |

* cited by examiner

*Primary Examiner* — Ula C Ruddock
*Assistant Examiner* — Amanda Barrow
(74) *Attorney, Agent, or Firm* — Carter, DeLuca, Farrell & Schmidt LLP

(57) ABSTRACT

An electronic apparatus which uses a battery as a power source includes a battery storage unit configured to store the battery which can be inserted and removed, a locking member configured to move between a position at which the battery stored in the battery storage unit is locked and a position at which the lock of the battery is released by rotating in a direction perpendicular to a direction that the battery is inserted to and removed from the battery storage unit, a drive member which is movably supported in the insertion and removal direction of the battery with respect to the battery storage unit, and on which a claw abutting on the locking member is formed, and an urging member configured to urge the drive member in a direction that the battery is ejected, to attach the claw to the locking member.

6 Claims, 5 Drawing Sheets

ELECTRONIC APPARATUS

BACKGROUND OF THE INVENTION

1. Field of the Invention

The present invention relates to an electronic apparatus which has a battery storage unit, and more particularly to a locking mechanism configured to prevent movement of a battery stored in the battery storage unit from an opening of a battery storage housing in a direction that the battery is inserted and removed.

2. Description of the Related Art

Conventionally, a battery has been used as a power source in a portable electronic apparatus, such as a digital camera. Therefore, the electronic apparatus is provided with a battery storage device to store the battery in a housing. The battery storage device is provided with a battery insertion/removal port to enable a user to insert and remove a battery and a battery lid which can be opened and closed at the battery port.

Some of the battery storage devices are provided with a locking mechanism to prevent the battery from moving in a direction that the battery is inserted and removed. Japanese Patent No. 4019776 discusses a locking mechanism including a locking member capable of moving along one side of a battery as seen from an opening of a housing, via which the battery is inserted into and removed from the battery storage unit.

However, since the locking mechanism discussed in Japanese Patent No. 4019776 includes the locking member that can move along one side of the battery, it is necessary to secure a margin of the locking member to move in a thickness direction (front-rear direction) of the housing of the electronic apparatus. Moreover, since the locking mechanism is arranged near a hinge portion which enables the battery lid to open and close, a required space is increased. In order to secure such a space, it becomes necessary to form angular corners on the housing of the electronic apparatus around its hinge portion, for example. Thus, this requirement makes it difficult to reduce thickness and downsize the electronic apparatuses.

SUMMARY OF THE INVENTION

According to an aspect of the present invention, an electronic apparatus which uses a battery as a power source includes a battery storage unit configured to store the battery which can be inserted and removed, a locking member configured to move between a position at which the battery stored in the battery storage unit is locked and a position at which the lock of the battery is released by rotating in a direction perpendicular to a direction that the battery is inserted to and removed from the battery storage unit, a drive member which is movably supported in the insertion and removal direction of the battery with respect to the battery storage unit, and on which a cam portion abutting on the locking member is formed, and an urging member configured to urge the drive member in a direction that the battery is ejected, to attach the cam portion to the locking member.

According to an exemplary embodiment of the present invention, thickness and size of a housing of an electronic apparatus can be reduced while securing a space in the vicinity of a hinge portion of a battery lid and design quality thereof.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 1A, 1B, and 1C illustrate an external appearance of a digital camera as an example of an electronic apparatus according to an exemplary embodiment of the present invention, in which FIG. 1A is a front view, FIG. 1B is a plan view, and FIG. 1C is a perspective view.

FIGS. 5A, 5B, and 5C illustrate partial sectional views of a battery locking mechanism of the battery storage device, in which FIG. 5A illustrates a state in which a battery is locked with a locking member, FIG. 5B illustrates a state in which a battery is in the process of being pulled out, and FIG. 5C illustrates a state in which a battery has been removed.

DESCRIPTION OF THE EMBODIMENTS

Various exemplary embodiments, features, and aspects of the invention will be described in detail below with reference to the drawings.

Figure 1A:
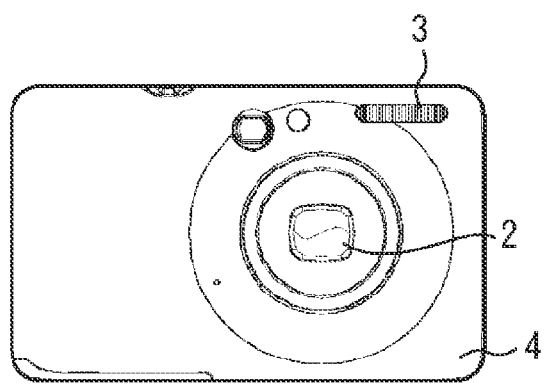
Figure 1C:
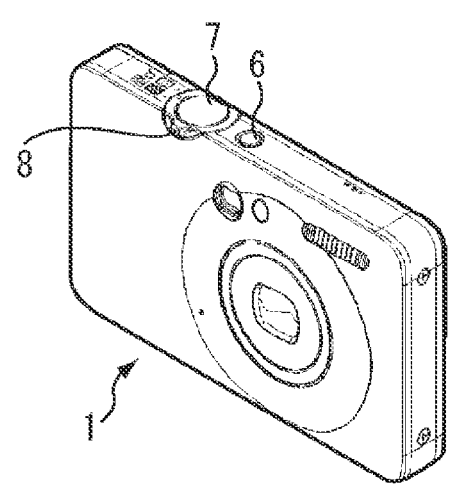
Figure 1B:
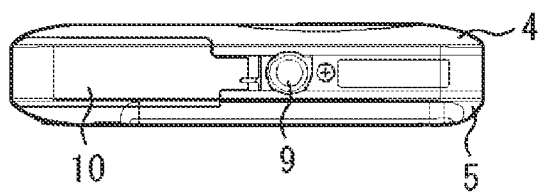

FIGS. 1A, 1B, and 1C illustrate an external appearance of a digital camera which is an example of an electronic apparatus according to an exemplary embodiment of the present invention. FIG. 1A is a front view, FIG. 1B is a plan view, and FIG. 1C is a perspective view.

An example of an electronic apparatus according to an exemplary embodiment of the present invention can be a digital camera 1 which uses a battery as a power source.

The digital camera 1 includes, on its front side, an imaging unit 2 and a flash unit 3 to emit a flash light. The imaging unit 2 includes an optical system lens (not shown), an image sensor, such as a charged coupled device (CCD), an automatic focus mechanism, and a zoom mechanism. A front cover 4 as an external cover and a rear cover 5 are respectively attached to the front side and to the rear side of the digital camera 1.

As illustrated in FIG. 1C, a power button 6, a release button 7 to be pressed down to take a still image or moving images, and a zoom lever 8 used to change an angle of view are provided on a top surface of the digital camera 1. The release button 7 is latched to the zoom lever 8 with a claw (not shown).

A tripod mounting unit 9 and a battery lid 10 are provided on a bottom side of the digital camera 1. The battery lid is mounted to be able to open and close and to form a part of the exterior of the digital camera 1.

Figure 2:
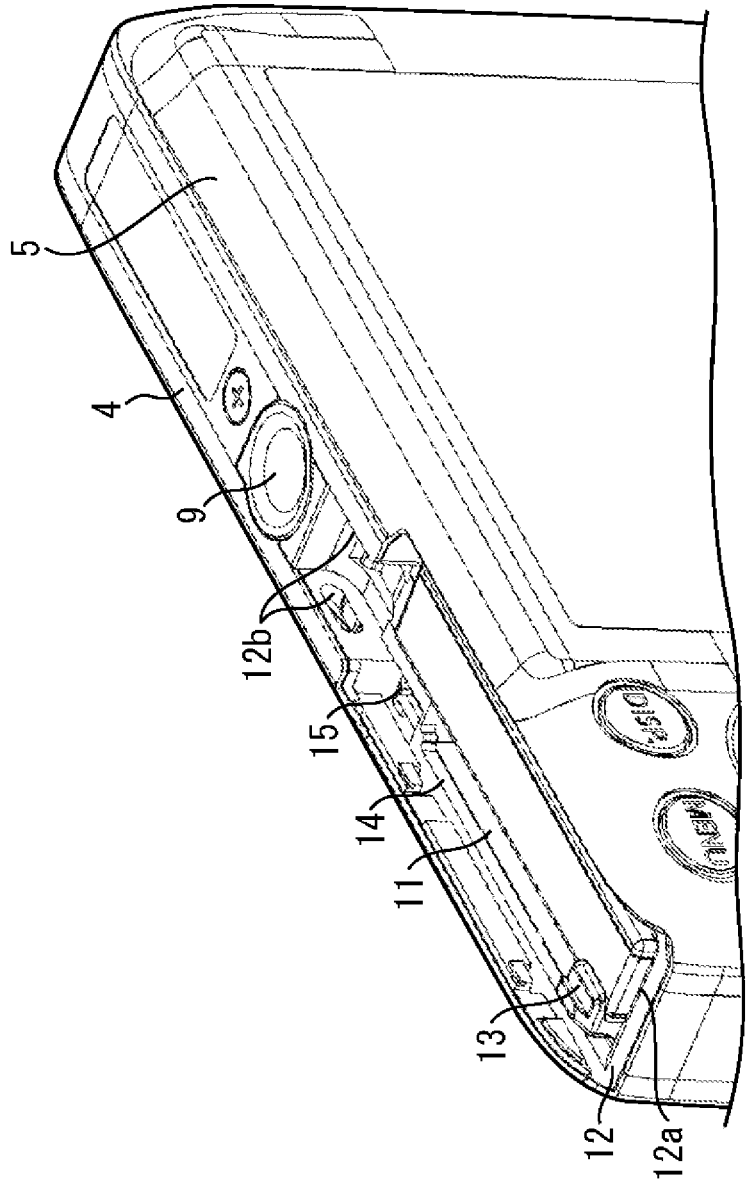
FIG. 2 illustrates a perspective view of a bottom side of the digital camera illustrated in FIGS. 1A, 1B, and 1C.

FIG. 2 is a perspective view illustrating the bottom side of the digital camera 1, showing a state in which a battery lid 10 is removed.

A battery storage device 12 is accommodated in the housing, which is covered with the battery lid 10, of the digital camera 1. The battery storage device 12 includes a battery storage unit 12a, a locking member 13, a recording medium storage unit 14, a detection switch 15, and two guide holes 12b of a roughly elongated hole shape, which are connected to an open-close shaft of the battery lid 10.

The battery storage unit 12a stores a battery 11 which can be inserted and removed. The locking member 13 prevents the battery 11 stored in the battery storage unit 12a from falling out.

The recording medium storage unit 14 has an opening shorter than a length in a longitudinal direction of an opening of the battery storage unit 12a. From the opening of the recording medium storage unit 14, a small-size recording medium, such as a secure digital (SD) card, can be inserted and removed. The detection switch 15 is an ON/OFF switch to detect an open or close state of the battery lid 10.

The opening of the recording medium storage unit 14, the locking member 13, and the detection switch 15 are positioned adjacent to the long side of the opening of the battery storage unit 12a, and aligned along the long side direction of the opening of the battery storage unit 12a as illustrated in FIG. 2.

The detection switch 15 is arranged near a hinge portion, which includes the open-close shaft of the battery lid 10, and guide holes 12b which engage with the open-close shaft. The locking member 13 is arranged in a position distant from the hinge portion. The opening of the recording medium storage unit 14 and the locking member 13 are located in a position adjacent to the long side of the opening of the battery storage unit 12a, and arranged within a range in the long-side direction of the opening. By arranging the locking member 13 near the guide holes 12b, it can avoid a problem that releasing the lock is obstructed by the battery lid 10 when a user handles the locking member 13.

Figure 3:
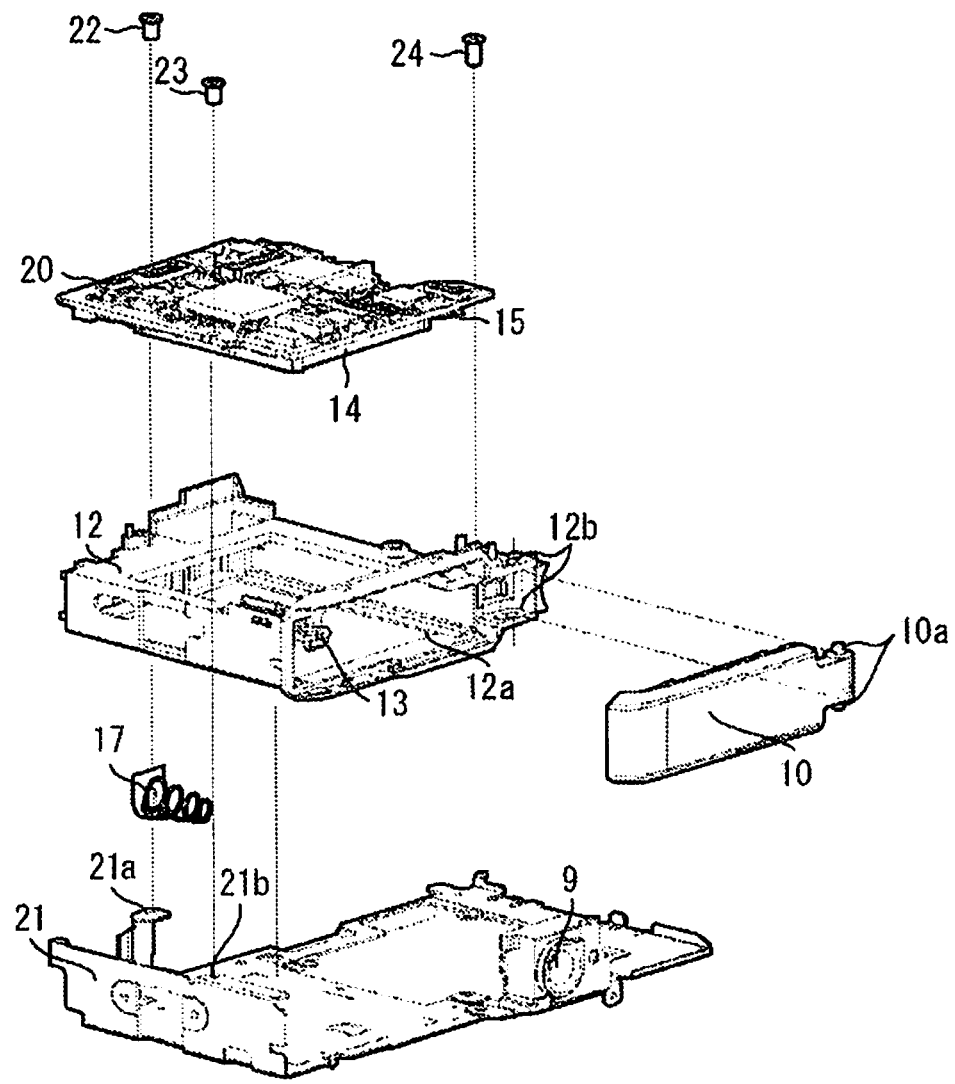
FIG. 3 is an exploded view of peripheral parts including a battery storage device in FIG. 2.

FIG. 3 is an exploded view of the peripheral parts including the battery storage device 12 illustrated in FIG. 2.

In FIG. 3, the open-close shaft 10a is formed at an end in the long-side direction of the battery lid 10. The open-close shaft 10a engages with both of the guide holes 12b of the battery storage device 12, so that a hinge portion of the battery lid 10 is formed and the battery lid 10 can be moved and rotated along the guide holes 12b.

In the battery storage device 12, a battery ejecting spring 17 is latched in the battery storage unit 12a with a claw (not illustrated). The battery ejecting spring 17 is configured to urge the battery 11 stored in the battery storage unit 12a in the direction that the battery 11 is inserted and removed. The locking member 13 is mounted at the opening of the battery storage unit 12a.

An electric substrate 20 is a component which controls an electric function of the digital camera 1. The recording medium storage unit 14 and the detection switch 15 are installed on a side of the electric substrate 20 facing the battery storage unit 12a. A screw 24 is fastened to a boss (not illustrated) on the battery storage device 12 via the electric substrate 20 in order to fix the electric substrate 20 to the battery storage device 12.

A main chassis 21 is used to mount the front cover 4 and the rear cover 5 and includes burring portions 21a and 21b used to fasten the covers 4 and 5 with screws. A screw 22 is fastened to the burring portion 21a and a screw 23 is fastened to the burring portion 21b, so that the main chassis 21 and the electric substrate 20 are fixed with the battery storage device 12 placed between them.

Figure 4:
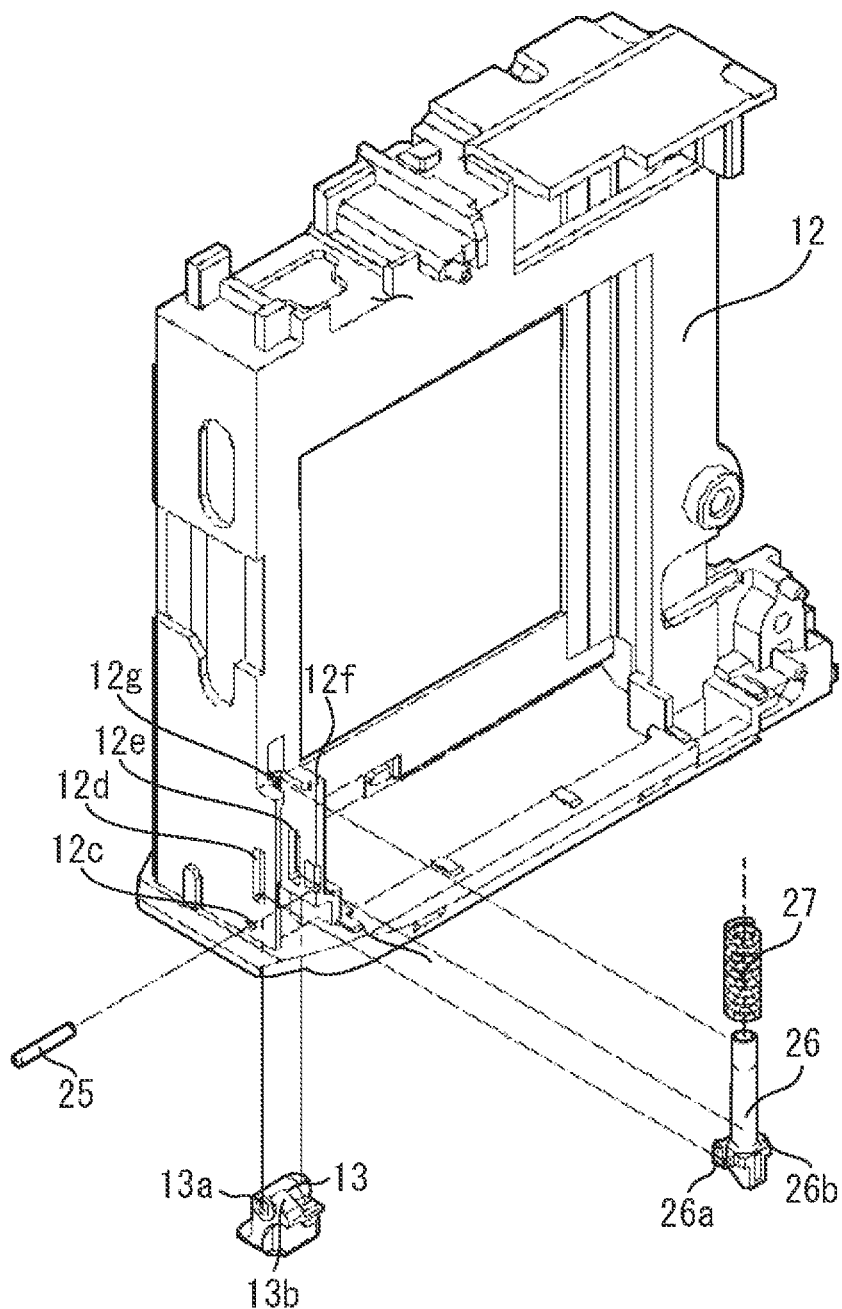
FIG. 4 is exploded view illustrating a schematic structural diagram of the battery storage device.

Next, a structure of a battery locking mechanism of the battery storage device 12 is described referring to FIG. 4.

FIG. 4 is an exploded view illustrating a schematic structure of the battery storage device 12.

As illustrated in FIG. 4, the battery locking mechanism is mounted in the battery storage device 12. The battery locking mechanism includes the locking member 13, a shaft 25, a drive member 26 which is formed by a high-polymer material, such as polyoxymethylene (POM) having a high slidability, and an urging member 27, such as a compression coil spring. In a space where the battery locking mechanism is mounted to the battery storage device 12, ribs 12f and 12g are formed. The ribs 12f and 12g includes long holes 12e and 12d which engage with the drive member 26 and restrict movement of the drive member 26 only in a direction that the battery 11 is inserted and removed.

The locking member 13 includes a hole 13a which is formed in a direction perpendicular to the insertion and removal direction of the battery 11. The locking member 13 also includes a cam surface 13b which contacts the drive member 26 when the locking member 13 is mounted on the battery storage device 12. The shaft 25 is fitted into the rib 12f by penetrating a hole 12c which is formed below the long hole 12d in the rib 12g and a hole 13a of the locking member 13 and functions as a rotary shaft of the locking member 13. The battery locking mechanism includes a structure in which the ribs 12f and 12g are located perpendicular to the rotary shaft of the locking member 13.

The drive member 26 includes a column-shaped portion extending approximately parallel to the insertion and removal direction of the battery 11, and a pair of claws 26a and 26b extending to right and left in a direction perpendicular to the insertion and removal direction of the battery 11. When the drive member 26 is fitted into the urging member 27 and mounted between the ribs 12f and 12g, the claws 26a and 26b are guided by the long holes 12d and 12g of the ribs, and the drive member 26 is movably supported (in the vertical direction in the plane of the drawing) along the long holes 12d and 12e. The urging member 27 is in contact with the ribs 12f and 12g and the claws 26a and 26b of the drive member 26, and urges the drive member 26 in the insertion and removal direction of the battery 11.

At this time, not only an urging force in an ejecting direction of the battery 11 but also a force to break off a claw engagement of the drive member 26, which serve as a reaction force from the cam surface 13b of the locking member 13 are applied to the drive member 26. More specifically, the long holes 12d and 12e not only serve as guides to guide the drive member 26 in the insertion and removal direction of the battery 11, but also serve to prevent the drive member 26 from dropping off from the battery storage device 12.

Figure 5A:
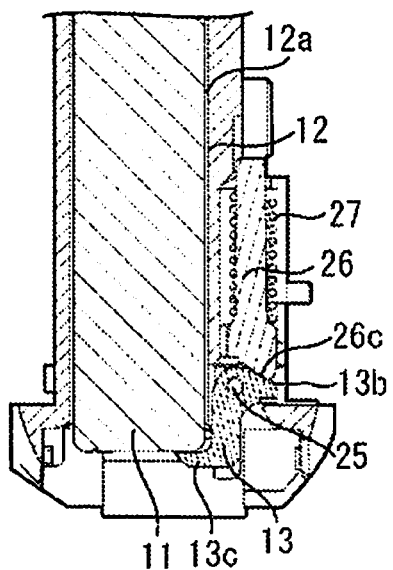
Figure 5B:
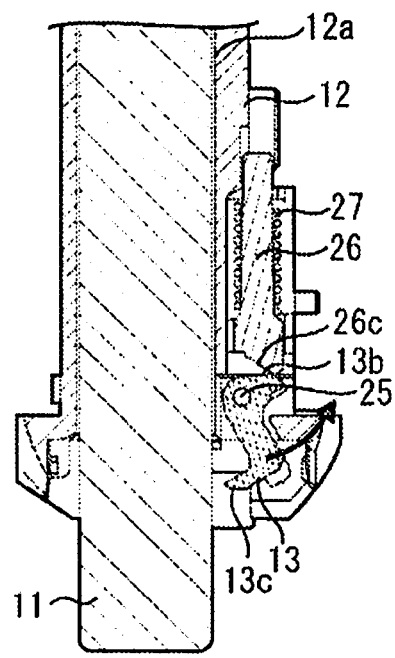
Figure 5C:
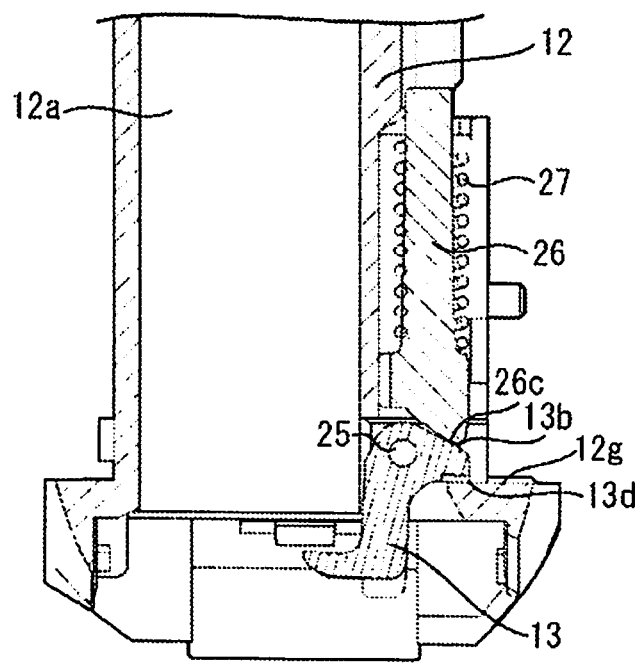

FIGS. 5A to 5C are partial sectional views of the battery locking mechanism of the battery storage device 12. FIG. 5A illustrates a state in which the battery 11 is locked by a locking member 13. FIG. 5B illustrates a state in which the battery 11 is in the process of being ejected. FIG. 5C illustrates a state in which the battery 11 has been ejected.

In FIG. 5A, in the state that the battery 11 is locked by the locking member 13, the drive member 26 is urged by the urging member 27 in the direction toward the locking member 13 (downwards on the drawing), and the cam surface 26c (cam portion) of the drive member 26 is in contact with the cam surface 13b of the locking member 13. As a result, the S-shaped locking member 13 is rotated around the shaft 25 to the direction in which the battery 11 is prevented from being ejected (clockwise direction on the drawing), and a leading edge 13c of the locking member 13 locks the battery 11.

In FIG. 5B, when a leading edge 13c of the locking member 13 is pushed by a user's operation in a direction shown by an arrow in the drawing, the battery 11 is ejected from the battery storage unit 12a by the battery ejecting spring 17. At this time, the cam surface 13b of the locking member 13 pushes up the cam surface 26c of the drive member 23, and a reaction force for returning the locking member 13 to its original position is generated by the urging member 27.

After the battery 11 is ejected from the battery storage unit 12a, as illustrated in FIG. 5C, a locking portion 13d of the locking member 13 abuts the rib 12g of the battery storage device 12 and rotation of the locking member 13 in a clockwise direction is stopped.

According to the present exemplary embodiment, by providing the configuration of the above described battery locking mechanism, the thickness and size of the housing of the digital camera 1 can be reduced while securing the space in the vicinity of the hinge portion of the battery lid and the design quality thereof. Moreover, the elongated battery locking mechanism can be formed in a direction parallel with the insertion and removal direction of the battery 11, and its thickness can be nearly as thin as the recording medium storage unit 14.

In an electronic apparatus including a thin recording medium storage unit 14, an elongated empty space tends to be provided near the recording medium storage unit 14, so that efficiency in space utilization can be improved by mounting the battery locking mechanism in the elongated empty space. Further, an occupied space in the vicinity of the battery lid 10 can be reduced, and corners around the hinge portion of the battery lid do not need to be angulated.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-029906 filed Feb. 12, 2009, which is hereby incorporated by reference herein in its entirety.

What is claimed is:

1. An electronic apparatus which uses a battery as a power source, the electronic apparatus comprising:
   a battery storage unit configured to store a battery which can be inserted and removed;
   a locking member configured to rotate so that a rotating axis of the looking member is perpendicular to a direction that the battery is inserted or removed from the battery storage unit between a position wherein the battery stored in the battery storage unit is locked and a position wherein the battery is released;
   a drive member which is movably supported in the direction that the battery is inserted or removed from the battery storage unit, and on which a cam portion abutting the locking member is formed; and
   an urging member configured to urge the drive member in the direction that the battery is removed, to move the cam portion into contact with the locking member to rotate the locking member to the position wherein the battery is locked.

2. The electronic apparatus according to claim 1, further comprising:
   a recording medium storage unit which includes an opening whose length is shorter than a longitudinal length of an opening provided on the battery storage unit and is configured to store a recording medium which can be inserted and removed,
   wherein the opening of the recording medium storage unit and the locking member are arranged in a position adjacent to a long side of the opening of the battery storage unit.

3. The electronic apparatus according to claim 2, further comprising:
   a battery lid which is mounted to open and close to uncover and cover the opening provided on the battery storage unit; and
   a detection switch configured to detect an opened or closed state of the battery lid,
   wherein the opening of the recording medium storage unit, the locking member, and the detection switch are aligned in a position adjacent to the long side of the opening of the battery storage unit.

4. The electronic apparatus according to claim 3, wherein the detection switch is arranged adjacent to a hinge portion configured to open and close the battery lid, and the locking member is arranged in a position separated from the hinge portion.

5. The electronic apparatus according to claim 1, wherein an elongated hole and a rib configured to movably guide the drive member in the insertion and removal direction of the battery are formed in the battery storage unit, and a hole into which a rotary shaft of the locking member is inserted is formed in the rib.

6. The electronic apparatus according to claim 1, wherein a locking portion and a contact portion are formed on the locking member, wherein the locking portion protrudes from a rotation center of the locking portion and locks the battery when the battery is inserted into the battery storage unit, and wherein the contact portion protrudes in a direction opposed to a direction that the locking portion protrudes.

* * * * *